Feb. 22, 1938.　　　A. G. LAUCK ET AL　　　2,109,391
APPARATUS FOR SURFACE TREATING GLASS CONTAINERS
Filed July 29, 1936　　　3 Sheets-Sheet 1
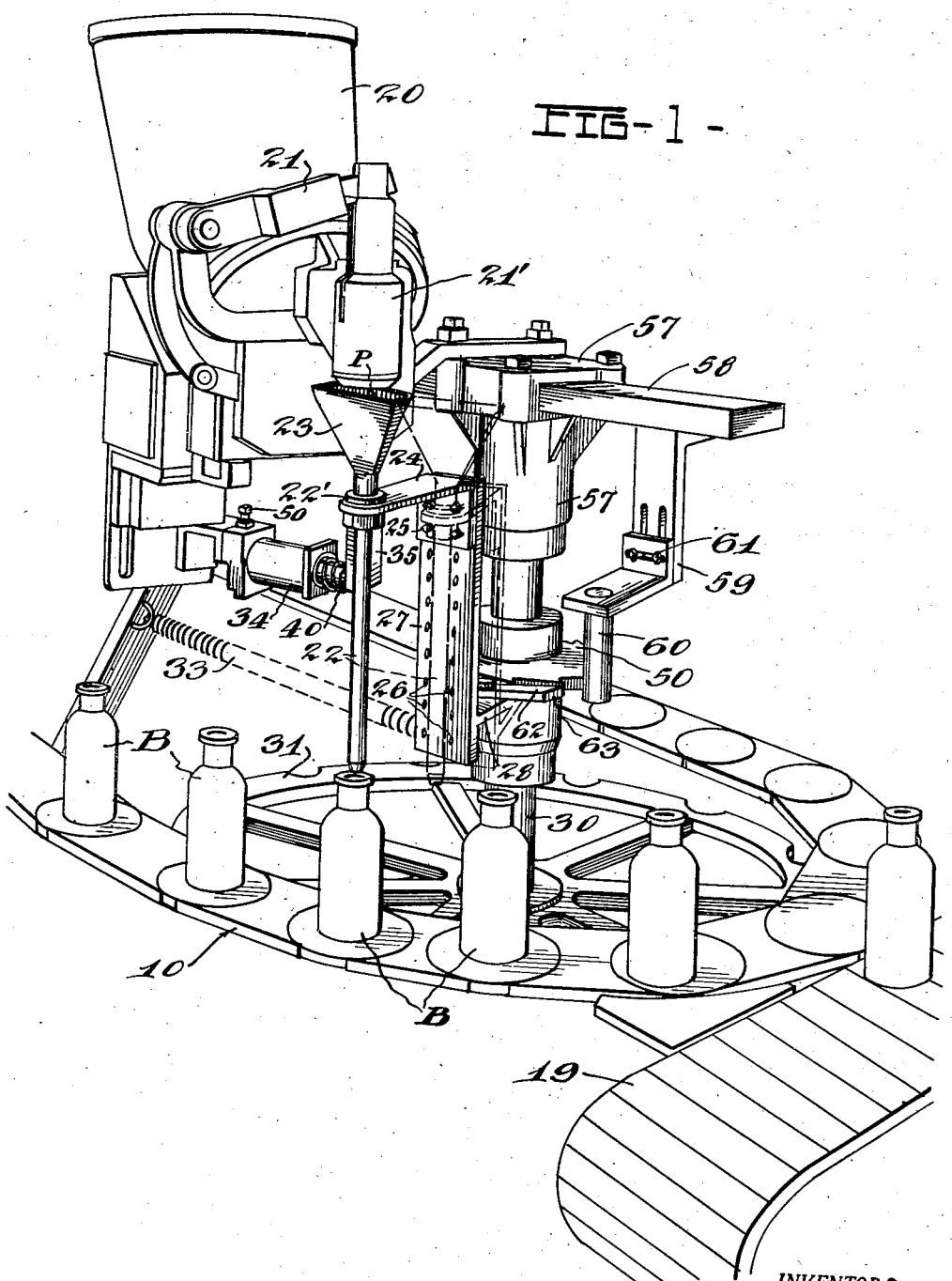
FIG-1-
INVENTORS
A. G. Lauck &
J. M. Johnson.
BY Rule & Hoge
ATTORNEYS.

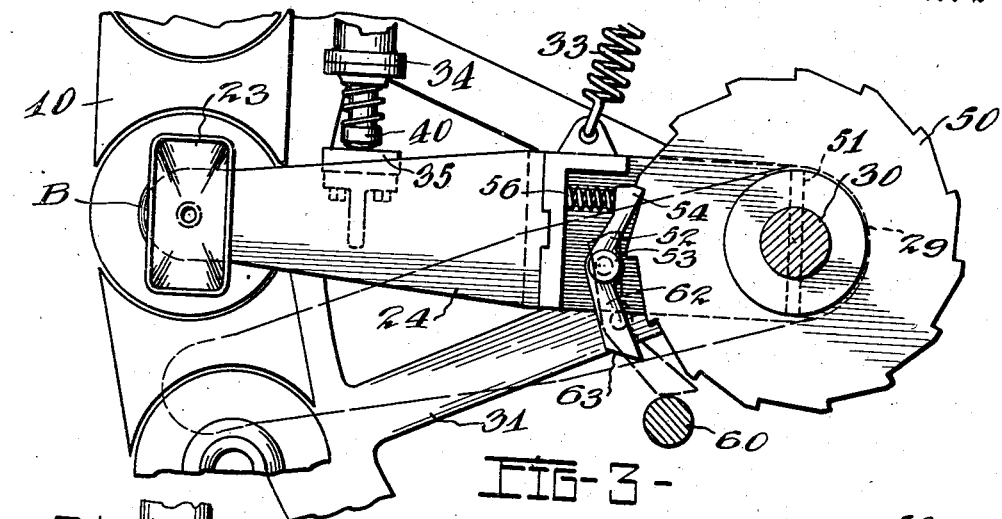
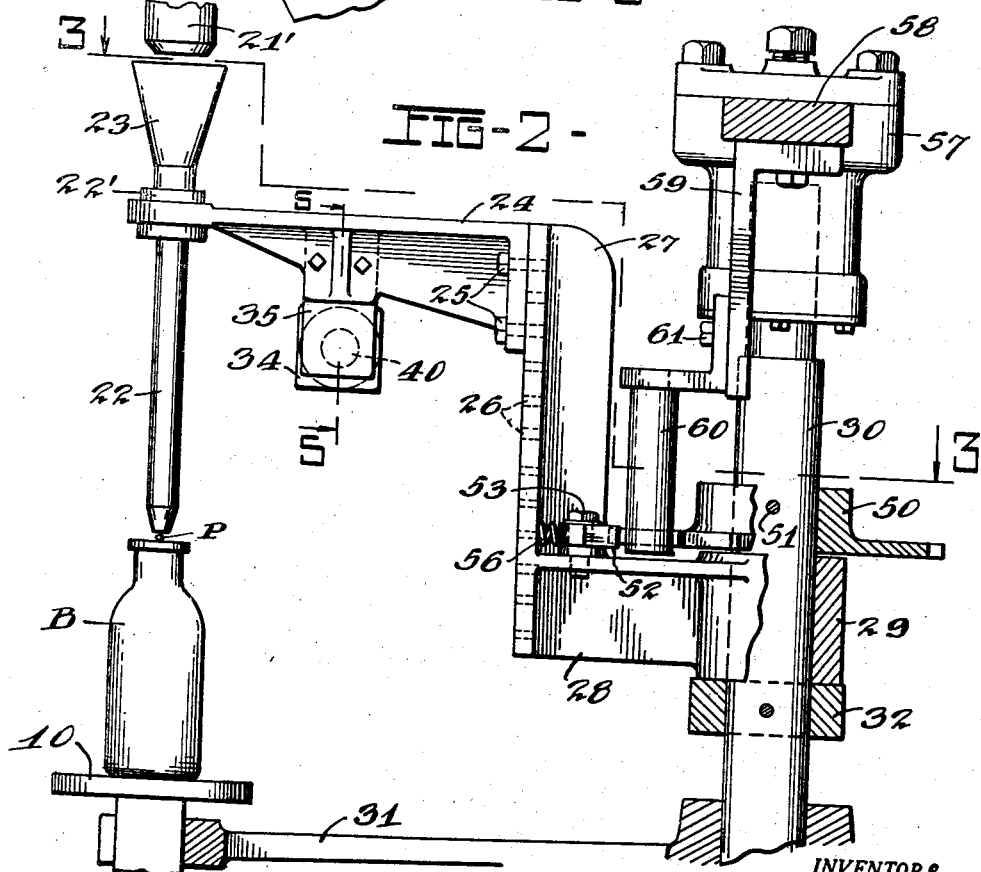

Feb. 22, 1938.　　　A. G. LAUCK ET AL　　　2,109,391
APPARATUS FOR SURFACE TREATING GLASS CONTAINERS
Filed July 29, 1936　　　3 Sheets-Sheet 3
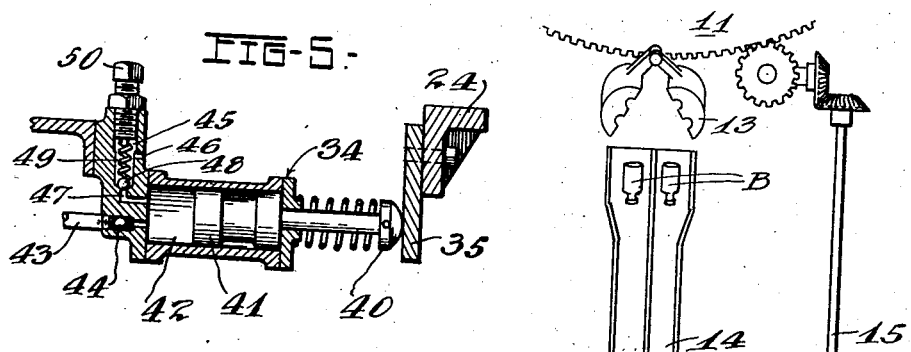
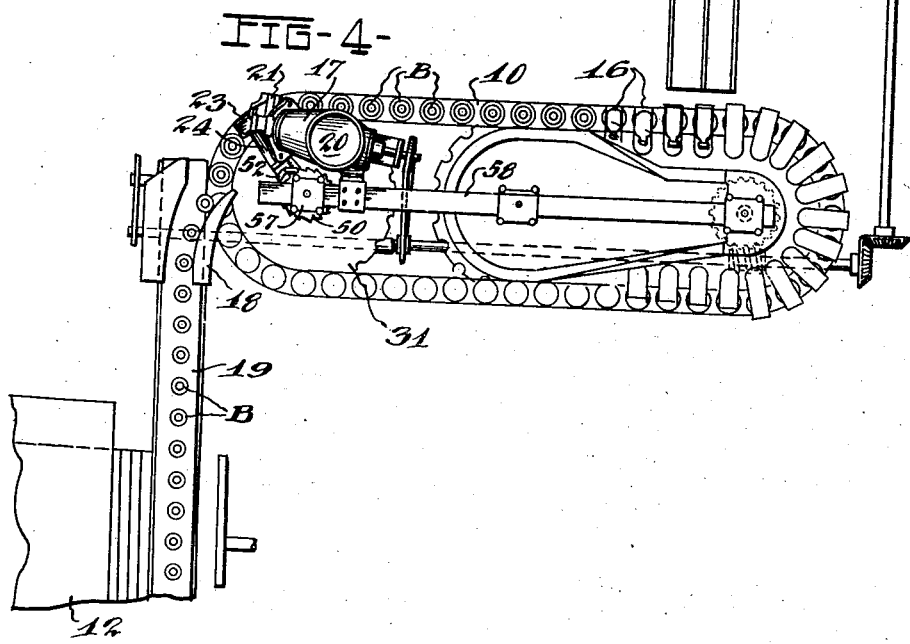
INVENTORS
A.G.Lauck &
J.M.Johnson.
BY Rule & Hoge
ATTORNEYS.

Patented Feb. 22, 1938

2,109,391

UNITED STATES PATENT OFFICE 2,109,391

APPARATUS FOR SURFACE TREATING GLASS CONTAINERS

Albert G. Lauck and Julius M. Johnson, Alton, Ill., assignors to Owens-Illinois Glass Company, a corporation of Ohio Application July 29, 1936, Serial No. 93,240

2 Claims. (Cl. 49—14)

The present invention relates to apparatus for surface treating glass and other ceramic containers and more particularly to an apparatus for treating the interior surfaces of bottles and jars.

Glass containers such as bottles and jars which are used in the marketing of liquids are of such character that over a comparatively short period of time they leach out the alkali at and in close proximity to the interior surface thereof. One method of avoiding the above noted objection consists in depositing in the container, prior to the annealing thereof, and while the latter is hot, a pellet which, when subjected to the residual heat of the article, fires and creates within the container an acid gas.

The principal object of the present invention is to provide a fully automatic apparatus which is synchronized with the transferring mechanism for transferring the containers from the forming machine to the annealing leer and which will deposit in each individual container during its transfer, a single pellet which, when subjected to the heat of the container, fires and creates an acidic gas operating to neutralize the alkalinity of the interior surface of the container.

Another object of the invention is to provide such an apparatus having a movable feed pipe through which the pellets pass and are directed into the containers, the feed pipe travelling with each individual container in alignment with the filling opening thereof throughout a portion of its path of travel from the forming machine to the annealing leer, thus insuring that the pellets individually fed by the feed pipe are individually received by the containers without loss of any of the pellets due to misalignment of the feed pipe and containers.

Other objects of the invention will be in part apparent and in part pointed out.

In the accompanying drawings:

Fig. 1 is a fragmentary perspective view showing an apparatus manufactured in accordance with the principles of the invention designed for operation in conjunction with a forming machine (not shown), annealing leer, and machine conveyor.

Fig. 2 is an enlarged fragmentary end elevational view of the apparatus, certain parts thereof being broken away and other parts thereof being shown in section to more clearly reveal the nature of the invention.

Fig. 3 is a sectional plan view taken substantially along the line 3—3 of Fig. 2.

Fig. 4 is a top plan view of the surface treating apparatus showing the same operating in conjunction with a forming machine and an annealing leer. This view is schematic in its representation.

Fig. 5 is a sectional view taken substantially along the line 5—5 of Fig. 2.

The pellet depositing apparatus (Figs. 1 and 4) is shown in operative relation to a machine conveyor 10 which is disposed between a standard form of bottle machine 11 and a conventional type of annealing leer 12. Bottles B produced in the molds 13 of the forming machine 11 are received in pairs on an inclined chute 14 which conveys them to, and places them on, the conveyor 10 near one end thereof in a horizontal position.

The conveyor 10 is driven synchronously with the bottle machine operations in any convenient manner, as for example, by suitable gearing 15.

The bottles B are successively up-ended at a given point 16 on the conveyor 10 by a conventional mechanism (not shown) and are moved in an upright position in succession beneath a dispenser 17, operatively connected to the conveyor 10, by means of which the pellets P are individually delivered thereto.

The treated bottles B are removed from the conveyor 10 at the other end of the conveyor by means of a guide member 18 which projects into the path of the bottles B and guides them from the conveyor 10 onto the leer conveyor 19 in an upright position.

The dispenser (Fig. 1) includes a hopper 20 which is operatively associated with a feeding mechanism 21 by means of which the pellets P are delivered from a discharge nozzle 21' one at a time, in timed relation to the movement of the conveyor 10, to a feed pipe 22, the lower end of which terminates at a level just above the level of the mouth or filling opening of the bottles B, and the upper end of which is provided with a flared portion 23 or funnel.

The feeding mechanism 21 is of standard design and no claim is made in this application to any novelty in connection therewith. The entire feeding mechanism is incorporated in the dispensing apparatus and is operatively connected to the driving mechanism of the conveyor 10 in such a manner that the pellets P contained in the hopper 20 are discharged one at a time as required, into the feed pipe 22.

The feed pipe 22 and communicating funnel 23, which may be considered a part thereof, are formed separately, each being threadedly received in a sleeve 22' which is supported at the outer end of a supporting arm 24 which is in turn supported for vertical adjustment by means of cap screws 25 selectively receivable in threaded holes 26 provided in a swinging standard 27. The standard 27 is provided with a base 28 in the form of a radial arm provided with a sleeve 29 which is freely and rockably supported for horizontal swinging movement on a vertical shaft 30 which supports the idler wheel 31 or pulley of the conveyor 10. The sleeve 29 is supported upon a collar 32 pinned to the shaft 30.

The swinging standard 27, together with the arm 24 carried thereby is normally held by means of a coil spring 33 in the retracted full line position shown in Fig. 1 against a pneumatic shock absorbing device 34 shown in detail in Fig. 5, a plate 35 being secured to the arm 24 for contact therewith. The standard 27, arm 24, and feed pipe 22 are adapted to be swung forwardly in the direction of movement of the bottles B in timed relation thereto in such a manner that the lower end of the feed pipe 22 maintains its centered relation to the mouth or filling opening of each successive bottle throughout a predetermined distance or portion of the path of movement of the bottles B. During such travel of the feed pipe 22, a pellet P is discharged into the bottle B and subsequently the standard 27, arm 24 and feed pipe 22 are promptly returned by the spring 33 to their initial position with the feed pipe in alignment with the next succeeding bottle B.

Because of the relatively high speed of the conveyor 10 and the consequent rapidity with which the pellets P are discharged into the bottles, the shock absorbing device 34 is of a quick acting pneumatically replenished dash-pot type. The device 34 is shown in detail in Fig. 5 and consists of a spring pressed plunger 40 secured to a piston 41 mounted for reciprocation in a cylinder 42. Air under pressure is admitted through a conduit 43, in which there is disposed a check valve 44, to the cylinder 42 to aid in maintaining the spring pressed plunger 40 in its extended position. The dash-pot action is obtained by the provision of a valve chamber 45, vented to the atmosphere as at 46 and which communicates with the cylinder 42 through a vent 47 which is normally closed by a relief valve 48. The air pressure maintained in the cylinder 42 is controlled by means of a spring 49 disposed in the chamber 45 and bearing against the relief valve 48. An adjusting screw 50 is provided for the purpose of adjusting the tension of the spring 49.

The plunger 40 is adapted to receive and cushion the impact of the plate 35 provided on the swinging arm 24. Air which is forced from the interior of the cylinder 42 to the atmosphere through the vents 46 and 47 upon inward movement of the plunger 40 is quickly replenished through the conduit 43 and thus the plunger is promptly returned to its extended position to receive the rapid impulses of the plate 35.

In order to move the feed pipe 22 in timed relation to the movement of the conveyor 10 in such a manner that the lower end thereof is in register with the filling opening of each successive bottle B throughout a portion of its path of travel on the conveyor 10, a toothed driving wheel 50 of the ratchet type is mounted on the vertical conveyor shaft 30 and is pinned thereto as at 51 for uniform rotation therewith. A reverse acting pawl 52 is pivoted as at 53 to the radial arm 28 of the standard 27. The pawl 52 is provided with a thrust member 54 in the form of a detent which is normally urged against the driving wheel 50 by means of a spring 56 in such a manner as to project into the path of movement of the teeth provided on the wheel 50. Thus, the radial arm 28, together with the standard 27, supporting arm 24 and feed pipe 22 are, by virtue of the thrust applied to the pivot pin 53 through the thrust member 54, caused to swing about the axis of the conveyor shaft 30 in unison with the shaft. During such swinging movement, the lower end of the feed pipe 22 remains in register with the filling opening of one of the bottles B while at the same time the dispensing mechanism 17 operates to discharge a single pellet P to the feed pipe 22.

The upper end of the conveyor shaft 30 is mounted for rotation in a stationary head 57 (Fig. 1) from which there projects a longitudinally extending supporting arm 58. A depending two-piece adjustable bracket 59 is secured to the arm 58 and serves to support an abutment 60 in the form of a depending finger which is positioned in the path of movement of the reverse acting pawl 52. The position of the finger 60 may be adjusted vertically or longitudinally as desired by means of a pin and slot connection 61 provided between the sections of the bracket 59.

The reverse acting pawl 52 is provided with an abutment engaging arm 62 having a cam surface 63 adapted to engage the finger 60 upon movement of the swinging arm 28 to its extreme position. Upon such engagement between the cam surface 63 of the arm 62 and the finger 60, the reverse acting pawl 52 is swung about its axis in such a manner that the thrust member 54 is withdrawn from the path of movement of the teeth provided on the wheel 50 and the spring 33 is enabled to restore the standard 27 and supporting arm 24, together with the feed pipe 22 to its initial position in which the plate 35 engages the shock absorbing device 34. In this position the thrust member or detent 54 is immediately engaged by one of the teeth on the wheel 50 and the filling pipe 22 is again caused to move forwardly in alignment with the filling opening of one of the bottles B.

Because of the provision for vertical adjustment between the swinging arm 24 and the standard 27, the apparatus may be employed for surface treating bottles of different height. Where extremely tall bottles are encountered, the feed pipe 22 may be removed from the sleeve 22' and in its stead a shorter feed pipe may be substituted.

Modifications may be resorted to within the spirit and scope of the appended claims.

We claim:

1. The combination with a conveyor for transferring bottles from a forming machine to an annealing leer including a horizontal moving platform on which the bottles are received in spaced single file relationship, and a vertical shaft upon which one of the conveyor wheels is mounted, of a ratchet wheel mounted on said shaft for rotation in unison therewith, a radial support pivoted to said shaft for swinging movement in either direction in a horizontal plane, a stationary abutment, means normally urging said support into engagement with said abutment, a reverse acting pawl pivoted to said support and including a thrust member normally engaging said ratchet wheel whereby rotational movement of said ratchet wheel is transmitted to said support in the same direction, a cam member formed on said pawl, an abutment positioned in the path of movement of said cam member and adapted upon contact therewith to withdraw said thrust member from said ratchet wheel, a feed pipe carried by said support, the lower end of said feed pipe being adapted to successively register with the filling openings of said bottles on the platform during rotational movement of said support in the direction mentioned, and means synchronized with the movement of the conveyor for periodically delivering a small quantity of a solid to said feed pipe.

2. In an apparatus for injecting measured quantities of a solid into open ended containers, means for moving the containers in a horizontal arcuate path in single file spaced relationship, a radial support pivoted for swinging movement about a vertical axis passing through the center of curvature of said path, a feed pipe carried by said support, the lower end of said pipe terminating above the tops of said containers and overlying the path of movement of the open ends of said containers, a stationary abutment, means normally urging said support into engagement with said abutment, movable means carried by said support and cooperating with said container moving means for periodically swinging said support in the direction of movement of the containers and at the same rate of movement about said axis, means positioned in the path of movement of said movable means and adapted to be engaged thereby for rendering the same inoperative to permit said support to be swung in the other direction into engagement with said abutment, and means for periodically delivering a small quantity of a solid to said feed pipe.

ALBERT G. LAUCK.
JULIUS M. JOHNSON.